(12) United States Patent
Chen et al.

(10) Patent No.: US 7,642,532 B2
(45) Date of Patent: Jan. 5, 2010

(54) APERTURE DESIGN FOR IMPROVING CRITICAL DIMENSION ACCURACY AND ELECTRON BEAM LITHOGRAPHY THROUGHPUT

(75) Inventors: Chia-Jen Chen, Jhudong Township, Hsinchu County (TW); Hsin-Chang Lee, Hsin-Chu Xian (TW); Hung Chang Hsieh, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 765 days.

(21) Appl. No.: 11/340,249

(22) Filed: Jan. 26, 2006

(65) Prior Publication Data

US 2007/0172744 A1    Jul. 26, 2007

(51) Int. Cl.
*H01J 37/28* (2006.01)
(52) U.S. Cl. .................................. 250/492.22
(58) Field of Classification Search ............ 250/492.22, 250/492.2
See application file for complete search history.

(56) References Cited

U.S. PATENT DOCUMENTS 5,166,888 A * 11/1992 Engelke ..................... 716/21

OTHER PUBLICATIONS

U.S. Appl. No. 11/115,433 filed Apr. 27, 2005 entitled "System and Method For Manufacturing A Mask For Semiconductor Processing" in the name of Chen et al.

\* cited by examiner

*Primary Examiner*—Kiet T Nguyen
(74) *Attorney, Agent, or Firm*—Haynes And Boone, LLP (57) ABSTRACT

Disclosed is an improved aperture design for improving critical dimension accuracy and electron beam lithography. A pattern may be created on a reticle by passing an electron beam through a first aperture having a first shape comprising an upper horizontal edge, a lower horizontal edge, a vertical edge, an upper bevel, and a lower bevel, wherein a portion of the electron beam is projected onto a second aperture. The portion of the electronic beam is passed through the second aperture having a second shape, wherein the second shape is the first shape rotated horizontally by 180 degrees, and an overlapped portion of the first and second aperture is exposed on a surface of the reticle to create a pattern.

19 Claims, 10 Drawing Sheets

Figure 7
45 degree triangle beam

Figure 9

APERTURE DESIGN FOR IMPROVING CRITICAL DIMENSION ACCURACY AND ELECTRON BEAM LITHOGRAPHY THROUGHPUT

BACKGROUND

The present disclosure relates in general to semiconductor manufacturing technology, and more particularly, the present disclosure relates to beam lithography in semiconductor manufacturing technology. The present disclosure also relates to an improved aperture design for improving accuracy of critical dimension of an angle line and throughput of electron beam lithography.

In semiconductor manufacturing technology, electron beam (e-beam) lithography is commonly used to create a complex pattern on a reticle. Generally, electrons from electron source are accelerated and focused in the shape of a beam toward the reticle. The electron beam is scanned in the desired pattern across an e-beam resist on the reticle surface. The e-beam resist may be a positive-tone poly or a chemically amplified resist.

During e-beam lithography, multiple shots are required in order to create a pattern on the reticle. A shot is produced when the e-beam passes through a plurality of apertures and projects a shape on the reticle surface. Typically, the first aperture is composed of a rectangular shape and the second aperture is composed of at least one bevel. Examples of the shapes projected by the two apertures include a rectangle, a triangle, and a combination of rectangle and triangle. For example, a vertical or horizontal line pattern may be created based only on rectangles, while an angle line pattern may be created based on a combination of rectangles and triangles.

However, the requirement of multiple shots to create these patterns impacts the throughput of e-beam lithography, because multiple shots require a longer period of time to write. In addition, multiple shots make it difficult to align different positions of the shape. In order to correctly align the positions, a bias adjustment procedure is often performed. Bias adjustment utilizes a set of sub-deflectors to deflect the e-beam, such that the positions may be correctly aligned. But as a result of the bias adjustment, the accuracy of critical dimension suffers.

Therefore, a need exists to have an improved aperture design that eliminates the need for multiple shots in e-beam lithography and at the same time preserves the capability of using variable-shaped e-beam.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. It is also emphasized that the drawings appended illustrate only typical embodiments of this invention and are therefore not to be considered limiting in scope, for the invention may apply equally well to other embodiments.

DETAILED DESCRIPTION

Figure 1:
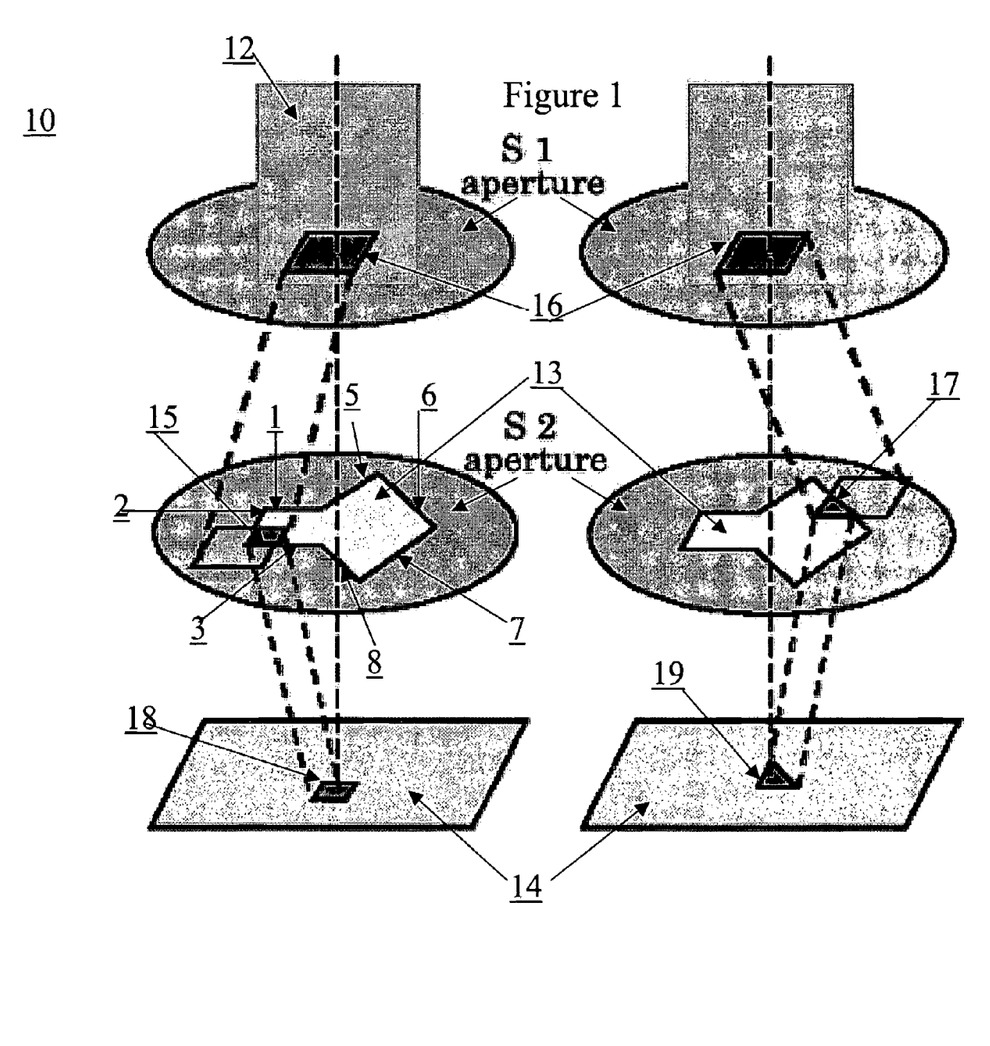
FIG. 1 is a diagram of an aperture design that requires multiple shots for creating a pattern on a reticle.

FIG. 1 is a diagram of an aperture design that requires multiple shots for creating a pattern on a reticle. As shown in FIG. 1, aperture design 10 comprises two apertures: S1 and S2. Aperture S1 has a rectangular shape 16, while aperture S2 has a shape 13 that composes three edges 1, 2, and 3 and four bevels 5, 6, 7, and 8. Horizontal edges 1 and 3 meet vertical edge 2 at a 90 degree angle. Bevels 5 and 8 meet horizontal edges 1 and 3 respectively at an angle greater than 90 degrees, while bevels 6 and 7 meet each other at an angle less than 90 degrees.

When e-beam 12 is focused towards reticle surface 14, the beam passes through the rectangular shape 16 of aperture S1 and is projected onto a portion of shape 13 of aperture S2. Consequently, the e-beam passes through the portion of shape 13 of aperture S2 resulting in an exposure of an overlapped portion 15 to the reticle surface 14. The overlapped portion 15 comprises an upper right corner of rectangular shape 16 and a lower left corner of shape 13, where edges 2 and 3 meet at a 90 degree angle. This exposure creates a shot on the reticle surface 14, which in turn creates a rectangle 18.

Similarly, also shown in FIG. 1, a second shot is produced by passing the e-beam through the rectangular shape 16 of aperture S1 and a different portion of shape 13 of aperture S2, where bevel 6 is located. An exposure of an overlapped portion 17 results, which creates a triangle 19 on reticle surface 14. The overlapped portion 17 comprises a lower left corner of rectangular shape 16 and an upper right corner of shape 13, where bevel 6 is located.

Figure 2:
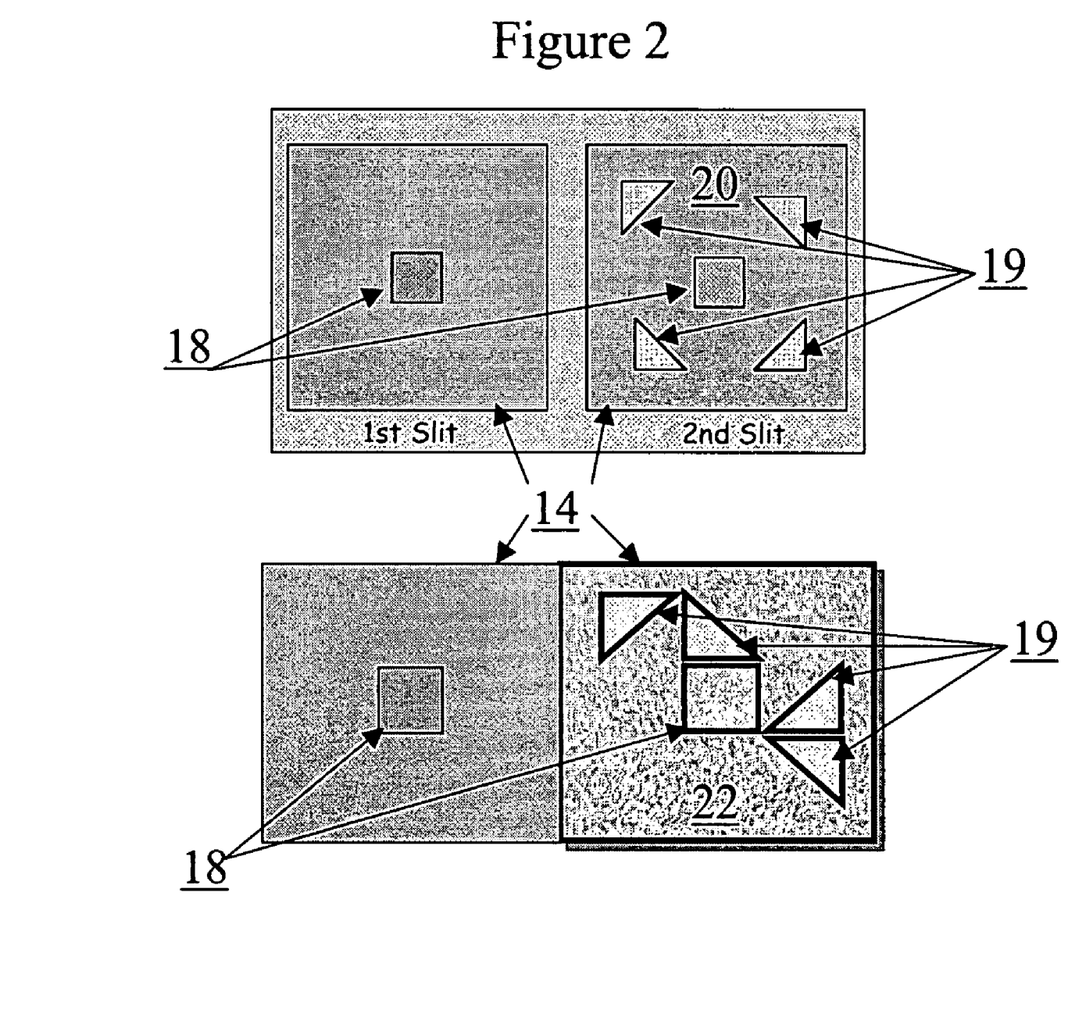
FIG. 2 is a diagram illustrating examples of patterns created by using apertures S1 and S2 in FIG. 1.

FIG. 2 is a diagram illustrating examples of patterns created by using apertures S1 and S2 in FIG. 1. As shown in FIG. 2, pattern 20 is created by multiple shots. The first shot creates a rectangle 18 on the reticle surface 14 by passing the e-beam through the rectangular shape 16 of aperture S1 and a portion of shape 13 of aperture S2 resulting in an exposure of an overlapped portion 15 to the reticle surface 14. The remaining shots create a set of triangles 19 on the reticle surface 14 by passing the e-beam through the rectangular shape 16 of aperture S1 and a different portion of shape 13 of aperture S2 resulting in an exposure of an overlapped portion 17 to the reticle surface 14.

Also shown in FIG. 2, pattern 22 is created by multiple shots. The first shot creates a rectangle 18 on the reticle surface 14 by passing the e-beam through the rectangular shape 16 of aperture S1 and a portion of shape 13 of aperture S2 resulting in an exposure of an overlapped portion 15 to the reticle surface 14. The remaining shots create a set of triangles 19 on the reticle surface 14 by passing the e-beam through the rectangular shape 16 of aperture S1 and a different portion of shape 13 of aperture S2 resulting in an exposure of an overlapped portion 17 to the reticle surface 14.

Figure 3:
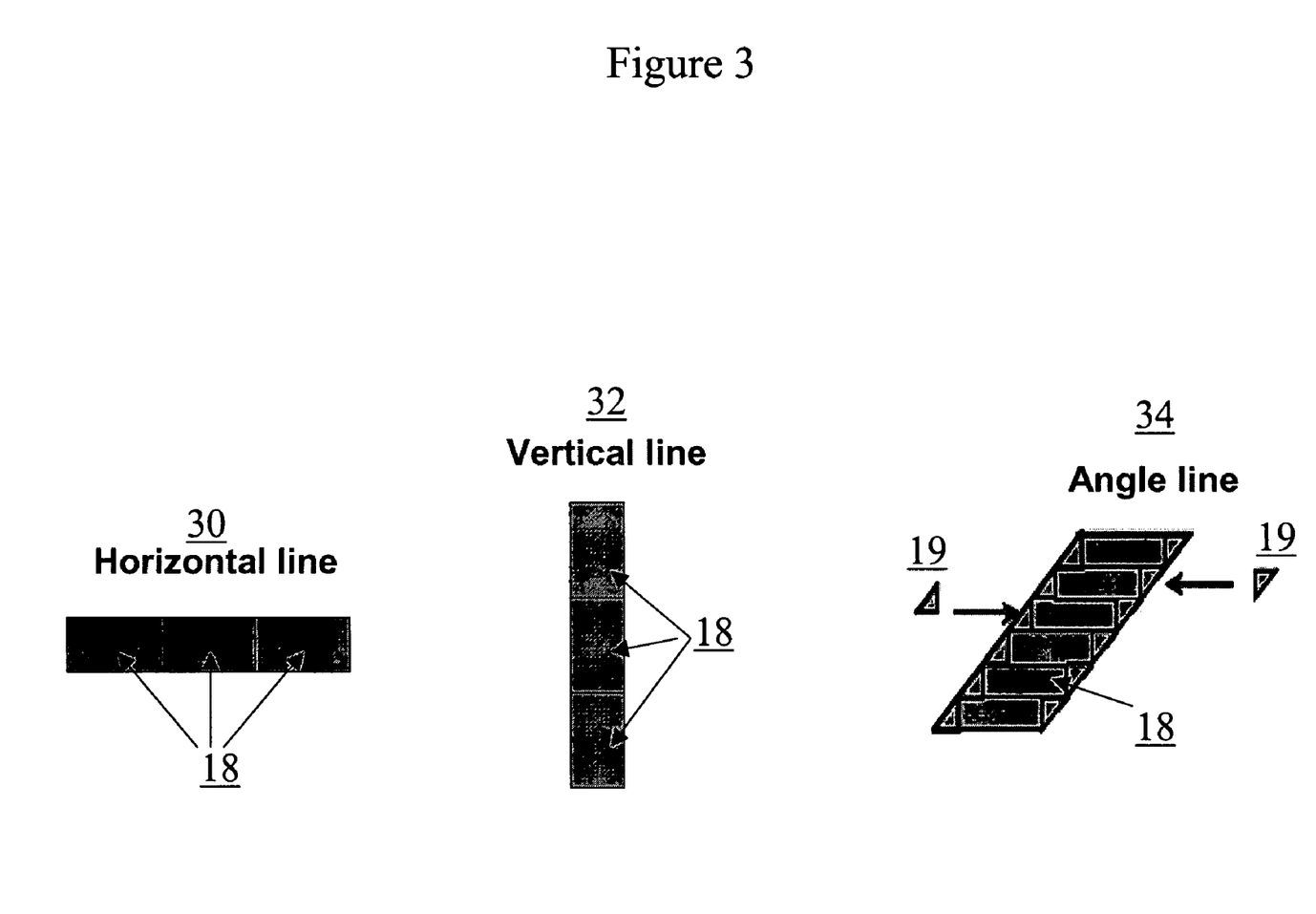
FIG. 3 is a diagram illustrating more examples of patterns created by using apertures S1 and S2 in FIG. 1.

FIG. 3 is a diagram illustrating more examples of patterns created by using apertures S1 and S2 in FIG. 1. As shown in FIG. 3, a horizontal line 30 and a vertical line 32 may be created by multiple shots of rectangles 18. In addition, an angle line 34 may be created by multiple shots of rectangles 18 and multiple shots of triangles 19.

As described above, the requirement of multiple shots to create a pattern has its shortcomings. In particular, multiple shots impact the throughput of e-beam lithography and make it difficult to align different positions of the shape. In addition, a bias adjustment is required to correctly align the positions, which reduces the accuracy of critical dimensions.

Figure 4:
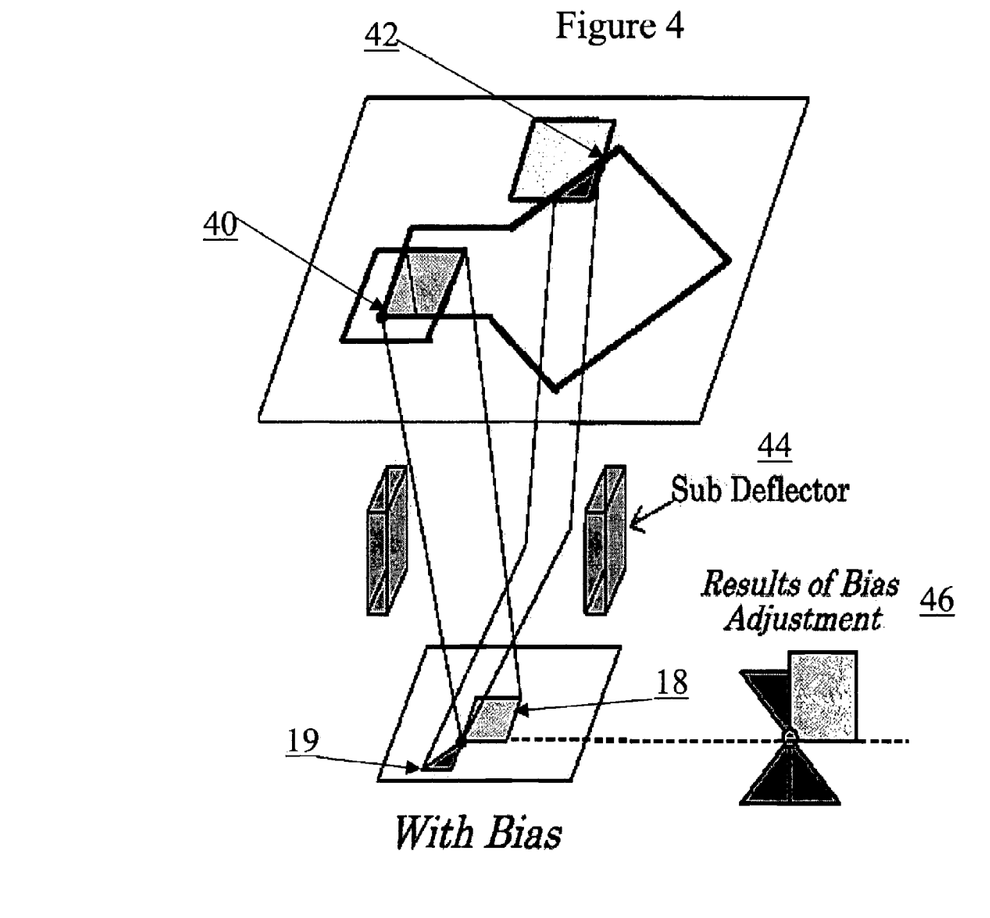
FIG. 4 is a diagram of exemplary-bias adjustments made to correctly align the positions of the patterns.

FIG. 4 is a diagram of exemplary bias adjustments made to correctly align the positions of the patterns. As shown in FIG. 4, the position of each pattern is based on a reference point. In this example, the position of rectangle 18 is based on reference point 40 and the position of triangle 19 is based on reference point 42. In bias adjustment, a set of sub-deflectors 44 is used to deflect the e-beam, such that reference point 42 may be correctly aligned with reference point 40. The result of the bias adjustments is shown in pattern 46.

Figure 5:
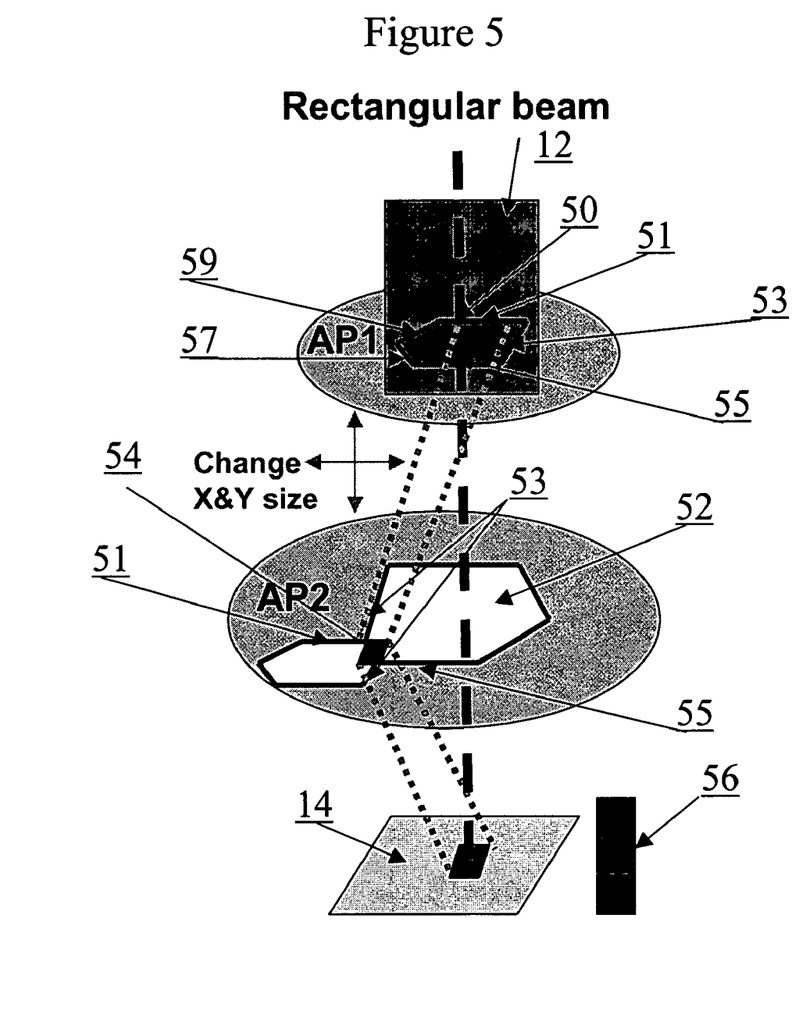
FIG. 5 is a diagram of a new aperture design for creating a pattern on a reticle with a single shot using a rectangular e-beam.

FIG. 5 is a diagram of a new aperture design for creating a pattern on a reticle with a single shot using a rectangular e-beam. As shown in FIG. 5, a new aperture design comprises two apertures: AP1 and AP2. Aperture AP1 and AP2 may be a reticle that is made of chromium or gold. Instead of passing through a rectangular shape 16 of S1, a rectangular e-beam 12 passes through a shape 50 of AP1 and is projected onto a portion of shape 52 of AP2. Shape 50 of AP1 comprises three edges 51, 53, and 55. Horizontal edges 51 and 55 meet vertical edge 53 at a 90 degree angle. Horizontal edges 51 and 55 also meet bevels 57 and 59 at an angle larger than 90 degrees. Bevels 57 and 59 meet each other at an angle less than 90 degrees.

Shape 52 of AP2 has the same shape as shape 50, except that shape 52 is rotated 180 degrees horizontally. Consequently, the rectangular e-beam 12 passes through a portion of shape 52 of AP2 resulting in an exposure of an overlapped portion 54 to the reticle surface 14. The overlapped portion 54 comprises an upper right corner of shape 50, where edges 51 and 53 meet at a 90 degree angle, and a lower left corner of shape 52, where edges 53 and 55 meet at a 90 degree angle. This exposure creates a shot on the reticle surface 14, which in turn creates a pattern 56 on reticle surface 14. In this example, the X and Y size of the pattern changes based on the apertures AP1 and AP2.

Figure 6:
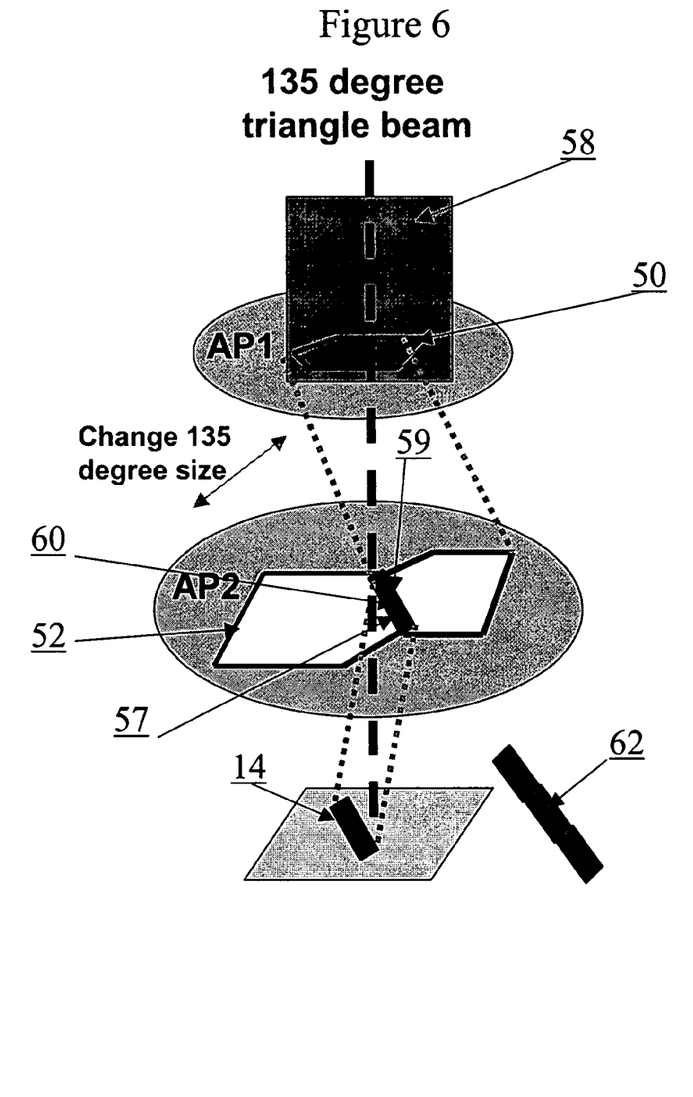
FIG. 6 is a diagram of a new aperture design for creating a pattern on a reticle with a single shot using a 135 degree triangle beam.

FIG. 6 is a diagram of a new aperture design for creating a pattern on a reticle with a single shot using a 135 degree triangle beam. As shown in FIG. 6, instead of passing through a rectangular shape 16 of S1, a 135 degree triangle e-beam 58 passes through a shape 50 of AP1 and is projected onto a portion of shape 52 of AP2. Consequently, the 135 degree triangle e-beam 12 passes through the portion of shape 52 resulting in an exposure of an overlapped portion 60 to the reticle surface 14. The overlapped portion 60 comprises a lower left corner of shape 50, where bevel 57 is located, and an upper right corner of shape 52, where bevel 59 is located. This exposure creates a shot on the reticle surface 14, which in turn creates a pattern 62 on reticle surface 14. In this example, the 135 degree size of the pattern changes based on the apertures AP1 and AP2.

Figure 7:
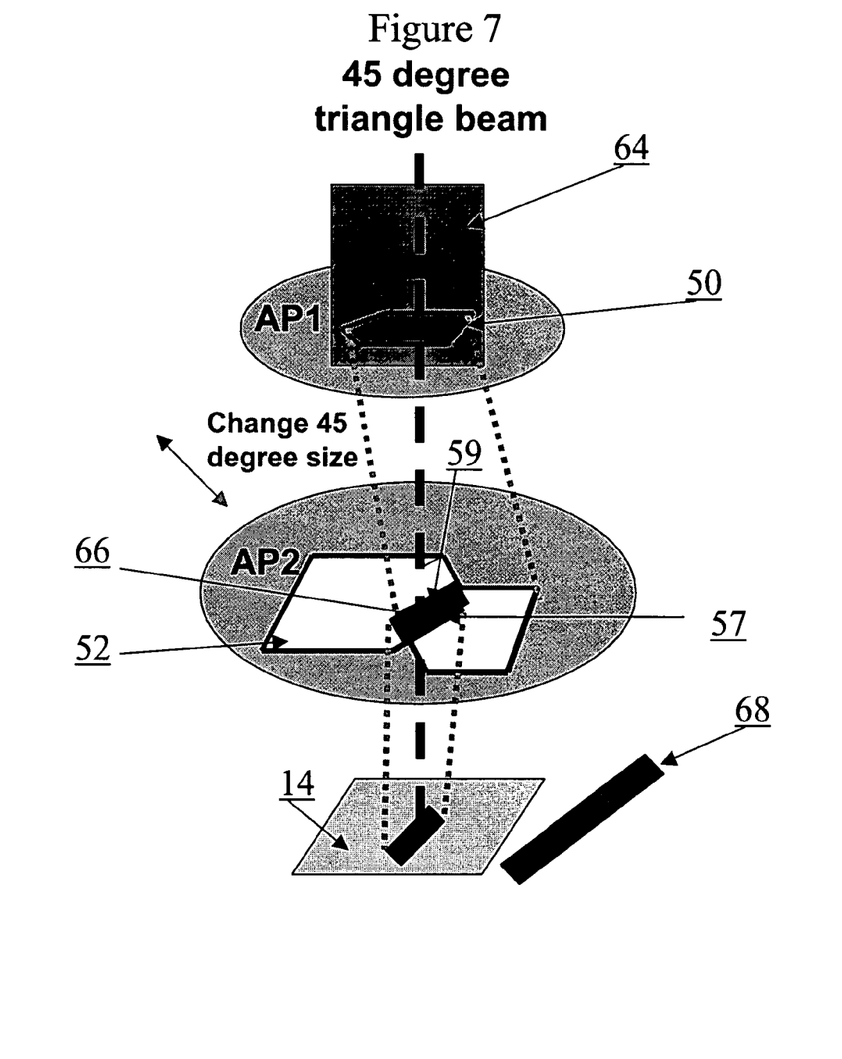
FIG. 7 is a diagram of a new aperture design for creating a pattern on a reticle with a single shot using a 45 degree triangle beam.

FIG. 7 is a diagram of a new aperture design for creating a pattern on a reticle with a single shot using a 45 degree triangle beam. As shown in FIG. 7, instead of passing through a rectangular shape 16 of S1, a 45 degree triangle e-beam 64 passes through a shape 50 of AP1 and is projected onto a portion of shape 52 of AP2. Consequently, the 45 degree triangle e-beam 64 passes through the portion of shape 52 resulting in an exposure of an overlapped portion 66 to the reticle surface 14. The overlapped portion 66 comprises an upper left corner of shape 50, where bevel 59 is located, and a lower right corner of shape 52, where bevel 57 is located. This exposure creates a shot on the reticle surface 14, which in turn creates a pattern 68 on reticle surface 14. In this example, the 45 degree size of the pattern changes based on apertures AP1 and AP2.

Figure 8:
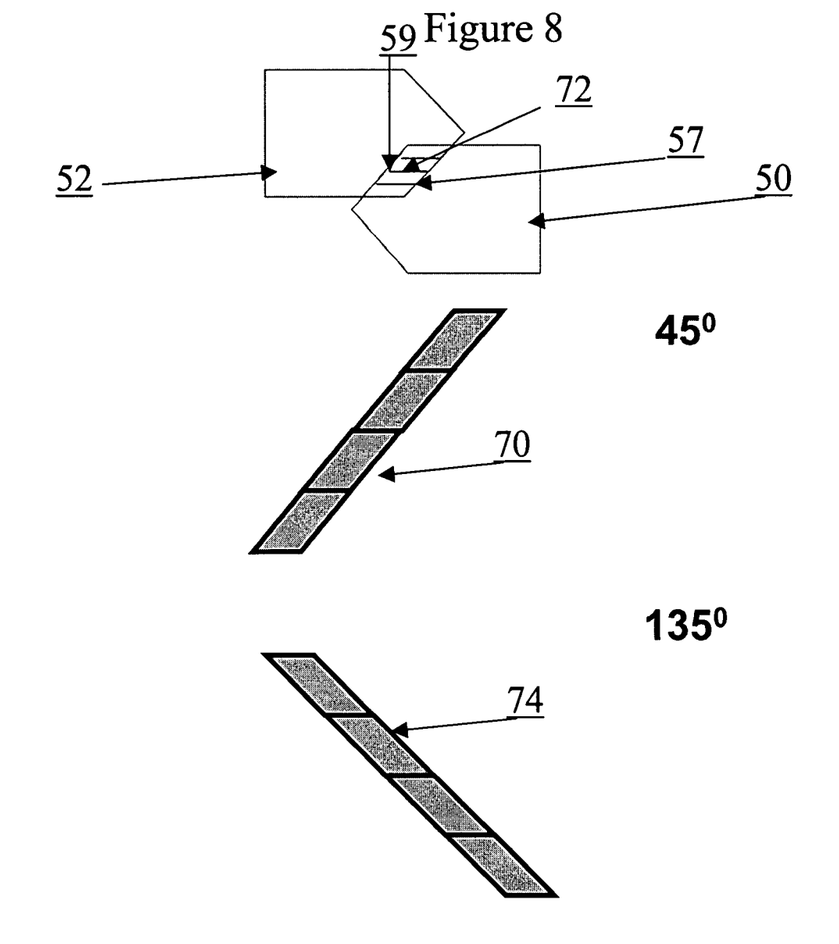
FIG. 8 is a diagram illustrating more examples of patterns created by using apertures AP1 and AP2 in FIGS. 6 and 7.

FIG. 8 is a diagram illustrating more examples of patterns created by using apertures AP1 and AP2 in FIGS. 6 and 7. By passing a 45 degree triangle e-beam through an upper left corner of shape 50 and a lower right corner of shape 52, an overlapped portion 72 is exposed to the reticle surface 14. This exposure creates a shot on the reticle surface 14, which in turn creates a pattern 70 on reticle surface 14. Pattern 74 may also be created by passing a 135 degree triangle e-beam through an upper right corner of shape 52 and a lower left corner of shape 50 to expose an overlapped portion 72 to the reticle surface 14

Figure 9:
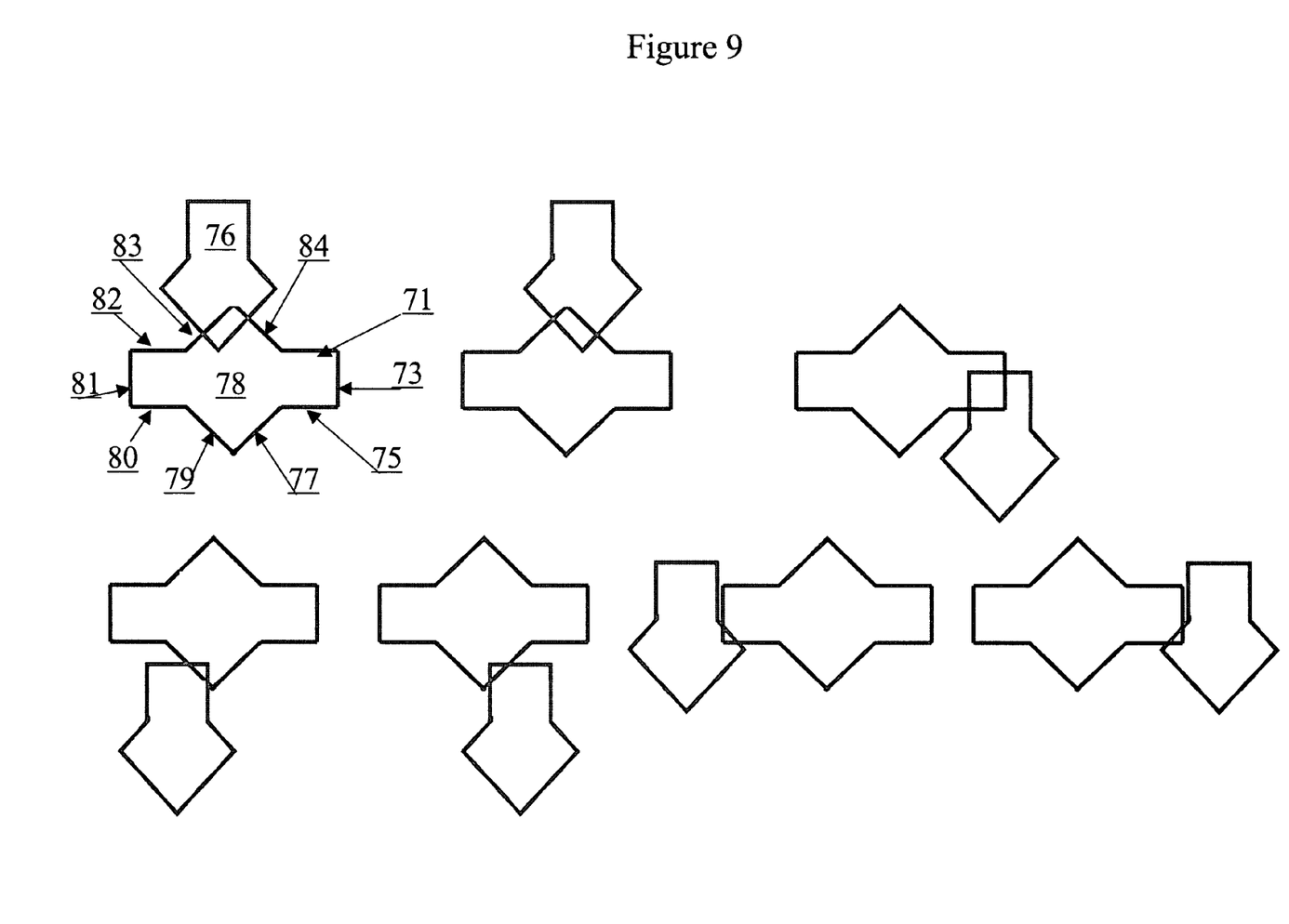
FIG. 9 is a diagram of other aperture designs for creating a pattern on a reticle with a single shot.

In addition to shape 50 and 52, other new aperture designs may be used to create different patterns on the reticle. FIG. 9 is a diagram of other aperture designs for creating a pattern on a reticle with a single shot. As shown in FIG. 9, a new aperture design comprises aperture AP1, which has a shape 76, and aperture AP2, which has a shape 78. Shape 76 has a shape similar to shape 13 in FIG. 1, but is rotated clockwise by 90 degrees. Shape 78 comprises six edges 71, 73, 75, 80, 81, and 82 and four bevels 77, 79, 83, and 84. Horizontal edges 82, 80 meet vertical edge 81 at a 90 degree angle. Similarly, horizontal edges 71 and 75 meet vertical edge 73 at a 90 degree angle.

Bevels 83 and 84 meet horizontal edges 82 and 71, respectively, at an angle greater than 90 degrees. In addition, bevels 83 and 84 meet each other at an angle less than 90 degrees. Similarly, bevels 77 and 79 meet horizontal edges 80 and 75, respectively, at an angle greater than 90 degrees. Bevels 77 and 79 also meet each other at an angle less than 90 degrees. Depending on the degree and shape of the e-beam employed, different overlapped portions are exposed, resulting in different patterns being created on reticle surface 14 as shown in FIG. 9.

Figure 10:
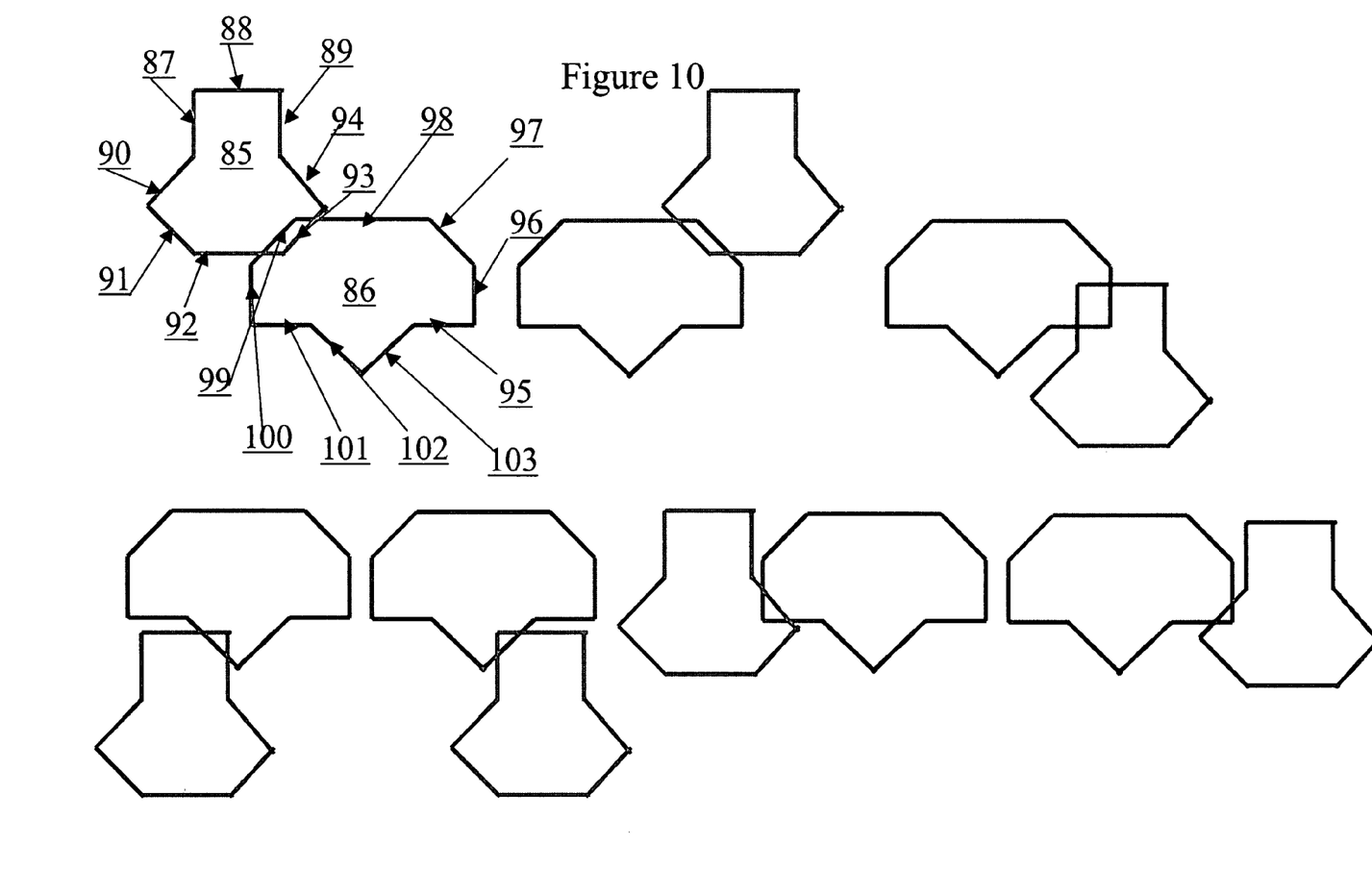
FIG. 10 is a diagram of more aperture designs for creating a pattern on a reticle with a single shot.

FIG. 10 is a diagram of more aperture designs for creating a pattern on a reticle with a single shot. As shown in FIG. 10, a new aperture design comprises aperture AP1, which has a shape 85, and aperture AP2, which has a shape 86. Shape 85 comprises four edges 87, 88, 89, and 92 and four bevels 90, 91, 93, and 94. Vertical edges 87 and 89 meet horizontal edge 88 at a 90 degree angle. Bevels 90 and 94 meet vertical edges 87 and 89 at an angle greater than 90 degrees. Bevels 90 and 94 also meet bevels 91 and 93, respectively, at an angle less than 90 degrees. In addition, bevels 91 and 93 meet horizontal edge 92 at an angle greater than 90 degrees.

Shape 86 comprises five edges 95, 96, 98, 100, and 101, two upper bevels 97 and 99, and two lower bevels 102 and 103 that meet each other at an angle less than 90 degrees. Horizontal edges 95, 101 meet bevels 102, 103 respectively at an angle greater than 90 degrees. In addition, vertical edges 96 and 100 meet horizontal edges 95 and 100, respectively, at a 90 degree angle. Also, vertical edges 96 and 100 meet upper bevels 97 and 99, respectively, at an angle greater than 90 degrees. Upper bevels 97 and 99 both meet horizontal edge 98 at an angle greater than 90 degrees. Depending on the degree and shape of the e-beam employed, different overlapped portions are exposed, resulting in different patterns being created on reticle surface 14 as shown in FIG. 10.

In summary, an improved aperture design is introduced in the present disclosure to eliminate the need for multiple shots in e-beam lithography and at the same time preserves the capability of using variable-shaped e-beam. Based on the new aperture designs, different shapes may be created on the reticle with a single shot. In addition, with the improved aperture designs, positions of patterns on a reticle may be correctly aligned and the accuracy of critical dimension may be improved. Thus, the throughput of electron beam lithography also increases.

In addition to using the improved aperture designs to create a single pattern on a reticle surface, a pattern generator may be created based on the improved aperture designs to generate multiple or different patterns on a reticle surface. Also, the pattern generator may be implemented as a direct writer that writes multiple or different patterns on a wafer mask. Furthermore, instead of creating or generating patterns, the improved aperture designs may be used to repair patterns that already exist on a reticle surface. In this way, only a single shot is required to generate or repair a pattern. In addition to electron beam, aspects of the present disclosure may be implemented using an ion beam.

It is to be understood that the following disclosure provides different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not itself dictate a relationship between various embodiments and/or configurations discussed.

What is claimed is:

1. A method of creating a pattern on a reticle, the method comprising:
    passing an electron beam through a first aperture having a first shape comprising an upper horizontal edge, a lower horizontal edge, a vertical edge, an upper bevel, and a lower bevel, wherein a portion of the electron beam is projected onto a second aperture;
    passing the portion of the electron beam through the second aperture having a second shape, wherein the second shape resembles the first shape being rotated horizontally by about 180 degrees; and
    exposing an overlapped portion of the first and second apertures on a surface of the reticle to create a pattern.

2. The method of claim 1, wherein the electron beam is a variable-shaped beam.

3. The method of claim 2, wherein the variable-shaped beam is at least one of a rectangular beam, a 45 degree triangle beam and a 135 degree triangle beam.

4. The method of claim 1, wherein the first aperture and the second aperture are made of at least one of chromium and gold.

5. The method of claim 1, wherein the two horizontal edges meet the vertical edge at a 90 degree angle.

6. The method of claim 1, wherein the upper and lower bevels meet each other at an angle less than 90 degrees.

7. The method of claim 1, wherein the overlapped portion comprises an upper right portion of the first shape and a lower left portion of the second shape.

8. The method of claim 7, wherein the upper right portion comprises a portion of the first shape where the upper horizontal edge meets the vertical edge at a 90 degree angle.

9. The method of claim 7, wherein the lower left portion comprises a portion of the second shape where the lower horizontal edge meets the vertical edge at a 90 degree angle.

10. The method of claim 1, wherein the pattern has a rectangular shape.

11. The method of claim 1, wherein the overlapped portion comprises an upper right portion of the second shape and a lower left portion of the first shape.

12. The method of claim 11, wherein the upper right portion comprises a portion of the second shape where the upper bevel is located.

13. The method of claim 11, wherein the lower left portion comprises a portion of the first shape where the lower bevel is located.

14. The method of claim 1, wherein the overlapped portion comprises a lower right portion of the second shape and an upper left portion of the first shape.

15. The method of claim 14, wherein the lower right portion comprises a portion of the second shape where the lower bevel is located.

16. The method of claim 14, wherein the upper left portion comprises a portion of the first shape where the upper bevel is located.

17. The method of claim 1, wherein the pattern has an angle line shape.

18. A pattern generator comprising:
    an electron beam writer for writing a pattern on a reticle surface, wherein the electron beam writing performs the steps of:
    passing a variable-shaped electron beam through a first aperture having a first shape comprising an upper horizontal edge, a lower horizontal edge, a vertical edge, an upper bevel, and a lower bevel, wherein a portion of the electron beam is projected onto a second aperture;
    passing the portion of the electron beam through the second aperture having a second shape, wherein the second shape resembles the first shape being rotated horizontally by about 180 degrees; and
    exposing an overlapped portion of the first and second apertures on a surface of the reticle to create a pattern.

19. An apparatus for repairing a pattern on a reticle surface comprising:
    an electron beam repair mechanism performing the steps of:
    passing a variable-shaped electron beam through a first aperture having a first shape comprising an upper horizontal edge, a lower horizontal edge, a vertical edge, an upper bevel, and a lower bevel, wherein a portion of the electron beam is projected onto a second aperture;
    passing the portion of the electron beam through the second aperture having a second shape, wherein the second shape resembles the first shape being rotated horizontally by about 180 degrees; and
    exposing an overlapped portion of the first and second apertures on a surface of the reticle to create a pattern.

* * * * *